US012593834B2

(12) United States Patent
Kroyer et al.

(10) Patent No.: US 12,593,834 B2
(45) Date of Patent: Apr. 7, 2026

(54) OPTICALLY STRUCTURED ELEMENT FOR A BIRD PROTECTION GLASS, OPTICAL SYSTEM AND USE OF THE OPTICALLY STRUCTURED ELEMENT

(71) Applicant: Fraunhofer-Gesellschaft zur Förderung der angewandten Forschung e.V., Munich (DE)

(72) Inventors: Thomas Kroyer, Freiburg (DE); Andreas Georg, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 391 days.

(21) Appl. No.: 18/035,980

(22) PCT Filed: Jul. 30, 2021

(86) PCT No.: PCT/EP2021/071484
§ 371 (c)(1),
(2) Date: May 9, 2023

(87) PCT Pub. No.: WO2022/096168
PCT Pub. Date: May 12, 2022

(65) Prior Publication Data
US 2024/0016139 A1     Jan. 18, 2024

(30) Foreign Application Priority Data
Nov. 9, 2020     (DE) ........................ 102020129482.4

(51) Int. Cl.
A01M 29/08      (2011.01)
E06B 3/67      (2006.01)
(Continued)

(52) U.S. Cl.
CPC ........... *A01M 29/08* (2013.01); *E06B 3/6715* (2013.01); *G02B 5/283* (2013.01); *G02B 5/286* (2013.01); *E06B 3/30* (2013.01)

(58) Field of Classification Search
CPC .......... G02B 5/283; G02B 5/286; G02B 1/10; G02B 1/11; G02B 1/14; G02B 5/20;
(Continued)

(56) References Cited

U.S. PATENT DOCUMENTS

| | | | |
|---|---|---|---|
| 2016/0137850 A1 | 5/2016 | Ridealgh et al. | |
| 2018/0173071 A1 | 6/2018 | Mathew et al. | |

(Continued)

FOREIGN PATENT DOCUMENTS

| | | |
|---|---|---|
| CN | 102576114 B | 10/2016 |
| CN | 111093983 A | 5/2020 |

(Continued)

OTHER PUBLICATIONS

D. Osorio, M. Vorobyev, and C. D. Jones, "Colour vision of domestic chicks" published in "The Journal of Experimental Biology", vol. 202, pp. 2951-2959, Figure 1, track D, (called Osorio99), Oct. 13, 1999.

*Primary Examiner* — Arnel C Lavarias
(74) *Attorney, Agent, or Firm* — Volpe Koenig

(57) ABSTRACT

An optically structured element (1) for minimizing or preventing bird collisions, includes a carrier element (2), a high-reflectivity region (3), and a low-reflectivity region (4); which is distinguished in that a double cone reflectance difference of a first double cone reflectance of the high-reflectivity region (3) and a second double cone reflectance of the low-reflectivity region (4) is greater than or equal to 5% and a VIS transmission ratio of the first VIS transmittance and the second VIS transmittance is greater than or equal to 70% and less than or equal to 200%.

15 Claims, 8 Drawing Sheets

(51) Int. Cl.
    *G02B 5/28*         (2006.01)
    *E06B 3/30*         (2006.01)

(58) Field of Classification Search
    CPC .......... G02B 5/208; G02B 5/26; G02B 5/285;
                    G02B 27/00; G02B 27/0006; A01M
             29/08; A01M 29/00; E06B 3/6715; E06B
                                         3/30
    USPC ........ 359/359, 350, 361, 507, 601.609, 601,
                                          359/609
    See application file for complete search history.

(56)                 References Cited

U.S. PATENT DOCUMENTS

| | | |
|---|---|---|
| 2019/0084874 A1 | 3/2019 | Weng et al. |
| 2021/0222486 A1* | 7/2021 | Veerasamy ........... E06B 3/6722 |

FOREIGN PATENT DOCUMENTS

| | | |
|---|---|---|
| CN | 106796306 B | 11/2020 |
| CN | 107846871 B | 8/2021 |
| TW | 583263 B | 4/2004 |
| WO | 2016198901 | 12/2016 |

* cited by examiner

1

2          3          4

1          3a      4      3b

7

8 →

2

| Sys-tem | $T_{vis}$ | $QT_{vis}$ | L* | a* | b* | Osori-o99D65 | BUVD65 | ΔDZ | ΔE |
|---|---|---|---|---|---|---|---|---|---|
| Glass | 91,2 | - | 96,51 | -0,48 | 0,132 | 7,9 % | 8,0 % | | |
| 10 | 78,5 | 86,1 % | 91,03 | 0,634 | -3,83 | 21,1 % | 9,4 % | 13,2 % | 6,9 |
| 10a | 76,3 | 83,6 % | 90,30 | -5,74 | -2,49 | 20,7 % | 13,5 % | 12,8 % | 8,5 |

OPTICALLY STRUCTURED ELEMENT FOR A BIRD PROTECTION GLASS, OPTICAL SYSTEM AND USE OF THE OPTICALLY STRUCTURED ELEMENT

CROSS-REFERENCE TO RELATED APPLICATIONS

This application is a 371 National Phase of International Application No. PCT/EP2021/071484, filed Jul. 30, 2021, which claims priority to German Patent Application No. 10 2020 129 482.4, filed Nov. 9, 2020, both of which are incorporated herein by reference as if fully set forth.

TECHNICAL FIELD

The invention relates to an optically structured element, an optical system, and the use of an optically structured element.

BACKGROUND

Collisions of birds with optical carrier elements, such as windows or other glazings, often result in injuries or even in the death of the animals. In addition, a non-negligible image damage for the owner of a building affected by bird strike arises due to these collisions of the birds with the carrier elements, designated as bird strike. Moreover, legal requirements for bird protection are set by the Federal Nature Conservation Act.

To avoid or reduce bird strike, the carrier elements have previously been coated, in particular pasted with films in the form of bird of prey silhouettes. Pasting glazings with films in the form of bird of prey silhouettes is ineffective in reducing bird strike. Satined glass is also used to reduce bird strike. However, satined glass annoys humans when looking through the glazing.

Bird protection glazings having a high-reflectivity region and a low-reflectivity region are known from WO 2016/198901 A1, which reflect electromagnetic radiation in a UV-centered wavelength range, at approximately 370 nm.

Numerous types of birds have special sensory cells in their eyes-so-called UV cones—which enable visual perception in a bird ultraviolet/violet band (BUVD) wavelength range. The BUVD wavelength range is between greater than or equal to 300 nm and less than or equal to 450 nm.

In contrast, the human eye enables visual perception in a VIS wavelength range, which is between greater than or equal to 380 nm and less than or equal to 780 nm.

It is stated in WO 2016/198901 A1 that the reflections in the BUVD wavelength range are visible to birds, but are only weakly to hardly visually perceptible to humans with the naked eye.

However, the previously known bird protection glazings only offer unsatisfactory effectiveness for reducing bird strike or the optical structures used are well visible to humans, for example in the case of satined glass, and can therefore be perceived as annoying.

SUMMARY

Proceeding from this prior art, the present invention is based on the object of providing an optically structured element which effectively prevents bird strike.

The present invention is additionally based on the object of specifying an optical system and the use of an optically structured element, by which bird strike is reduced and which are particularly inexpensive and efficient to produce and/or apply and which can be or are formed having additional functionalities.

This object is achieved according to the invention by an optically structured element having one or more of the features disclosed herein, by an optical system having one or more of the features disclosed herein, and by a use of the optically structured element having one or more of the features disclosed herein. Advantageous embodiments are described below and in the claims.

An optically structured element according to the invention for minimizing or preventing bird collisions comprises at least one carrier element, at least one high-reflectivity region, and at least one low-reflectivity region. The carrier element includes the at least one high-reflectivity region and/or the at least one low-reflectivity region. According to the invention, the optically structured element includes a first double cone reflectance in a double cone wavelength range and a first VIS transmittance in a VIS wavelength range in the high-reflectivity region. In the low-reflectivity region, the optically structured element according to the invention includes a second double cone reflectance in the double cone wavelength range and a second VIS transmittance in the VIS wavelength range. The double cone wavelength range is between greater than or equal to 400 nm and less than or equal to 700 nm and the VIS wavelength range is between greater than or equal to 380 nm and less than 780 nm. According to the invention, a double cone reflectance difference of the first double cone reflectance and the second double cone reflectance is greater than or equal to 5%, preferably greater than or equal to 10%, particularly preferably greater than or equal to 15%, most preferably greater than or equal to 20% and a VIS transmission ratio of the first VIS transmittance and the second VIS transmittance is greater than or equal to 70%, preferably greater than or equal to 80%, particularly preferably greater than or equal to 85%, most preferably greater than or equal to 90% and the VIS transmission ratio is less than or equal to 200%, preferably less than or equal to 180%, particularly preferably less than or equal to 150%, most preferably less than or equal to 130%.

The carrier element preferably includes a first carrier sub-element and a second carrier sub-element which are preferably each designed as a glass or film and are particularly preferably transparent in the VIS wavelength range. The first carrier sub-element is preferably arranged on the second carrier sub-element, wherein the second carrier sub-element is particularly preferably coated, laminated, or filmed using the first carrier sub-element.

In particular, the first carrier sub-element includes the high-reflectivity region and the second carrier sub-element includes the low-reflectivity region. For example, the first carrier sub-element is designed as a film and the second carrier sub-element is designed as window glass, as façade decoration glazing, or as another glazing.

The low-reflectivity region preferably corresponds to a surface of the second carrier sub-element visible in a top view, this visible surface is particularly preferably partially coated, in particular using the first carrier sub-element, wherein the coated area or the coated areas correspond to the high-reflectivity region or the high-reflectivity regions.

The inverse case is alternatively preferred, in which the high-reflectivity region corresponds to the surface of the second carrier sub-element visible in a top view and the coated area or the coated areas correspond to the low-reflectivity region or the low-reflectivity regions.

The carrier element is preferably designed as a coated glass and/or a colored glass or as a coated film and/or a colored film. The high-reflectivity region particularly preferably corresponds to a colored subregion and the low-reflectivity region corresponds to a non-colored subregion of the carrier element.

The optically structured element according to the invention is particularly effective in reducing bird strike, as studies of the applicant have shown. In particular, bird strike is more effectively prevented the greater the double cone reflectance difference is. The noteworthy effectiveness of the optically structured element according to the invention in reducing bird strike is based in the finding that in birds the perception of movements, in particular relative movements and stationary objects during flight is not carried out by the UV cones, but rather by so-called double cone sensory cells. The double cone sensory cells perceive the double cone wavelength range and have a sensitivity maximum at approximately 570 nm with a half-width of approximately 510 nm to 620 nm.

A further advantage is that at a value of the VIS transmission ratio closer to 100%, the visibility of the optically structured element in transmission is minimized for a human, wherein the advantageous reduction of the bird strike is maintained. The optically structured element is thus less visible to humans, for example, when looking through a window provided therewith from a room.

The high-reflectivity region and the low-reflectivity region are preferably determined upon a top view of the optically structured element by reflection measurements.

The double cone reflectances of the optically structured element, in particular the first and the second double cone reflectance, are preferably each determined by reflection measurements in the double cone wavelength range and weighting using an Osorio99D65 spectrum. The Osorio99D65 spectrum reflects the wavelength-dependent sensitivity of the double cone sensory cells and is known from the publication "Colour vision of domestic chicks" by D. Osorio, M. Vorobyev, and C. D. Jones, published in "The Journal of Experimental Biology", Volume 202, pages 2951-2959, from 1999, FIG. 1, track D, (called Osorio99). This spectrum was obtained from the analysis of double cones in chickens, but is also applicable in very good approximation for other typical types of birds. The data from Osorio99 (FIG. 1, track D) were weighted using the daylight-typical standard light type D65 to obtain the spectrum Osorio99D65.

The VIS transmittances are each determined by transmission measurements in the VIS wavelength range and weighted using a VIS spectrum, which corresponds to a brightness sensitivity curve of the human eye in daylight and can be inferred from the spectral data "CIE 2008, physiologically-relevant 2-deg V(I) luminous efficiency functions".

To determine the VIS transmission ratio, preferably the first VIS transmittance is divided by the second VIS transmittance and the result of this division is multiplied by 100%.

In a first preferred embodiment, a color distance in the visual transmission between the high-reflectivity region and the low-reflectivity region is less than or equal to 20, preferably less than or equal to 15, particularly preferably less than or equal to 10, most preferably less than or equal to 5.

The color distance between the high-reflectivity region and the low-reflectivity region is determined according to DIN ISO 11664-4.

In this preferred embodiment, the advantage results that at low color distance, the optically structured element is less noticeable to the human eye, but is consistently effective in the reduction of bird strike.

In a further advantageous embodiment, the at least one high-reflectivity region and the at least one low-reflectivity region are arranged adjoining one another. The at least one low-reflectivity region and the at least one high-reflectivity region are preferably designed intermeshing like combs.

This embodiment is particularly effective in the reduction of bird strike, since the adjoining areas are more easily and better recognizable for incoming birds.

In a further advantageous embodiment, the at least one high-reflectivity region is designed in such a way that a circular area having a diameter of 15 cm, preferably having a diameter of 10 cm, in particular having a diameter of 8 cm is not arrangeable completely within the high-reflectivity region and the at least one low-reflectivity region is designed in such a way that a circular area having a diameter of 15 cm, preferably having a diameter of 10 cm, in particular having a diameter of 8 cm is not arrangeable completely within the low-reflectivity region.

The at least one high-reflectivity region preferably cannot be completely covered by the circular area and the at least one low-reflectivity region also cannot be completely covered by the circular area.

The circular area is preferably defined in an orthogonal top view of the high-reflectivity region and/or the low-reflectivity region, for example by applying a circular area template having the corresponding diameter.

This embodiment is particularly effective in reducing bird strike, since in the case of larger circular areas, birds recognize an obstacle which can be overcome, in particular can be flown through, in relation to their body size and therefore collide with the carrier element at a higher probability.

In a further advantageous embodiment, the optically structured element has a first BUVD reflectance in the BUVD wavelength range in the high-reflectivity region and a second BUVD reflectance in the BUVD wavelength range in the low-reflectivity region. In this embodiment, a BUVD reflectance difference of the first BUVD reflectance and the second BUVD reflectance is preferably less than or equal to 20%, preferably less than or equal to 10%, particularly preferably less than or equal to 5%, most preferably less than or equal to 3%.

The BUVD reflectances of the optically structured element in the high-reflectivity region and in the low-reflectivity region are preferably each measured by reflection measurements in the BUVD wavelength range and determined by means of weighting using a BUVD65 spectrum. The BUVD65 spectrum reflects the wavelength-dependent sensitivity of the UV cones and is defined by a Gaussian curve having a maximum at approximately 370 nm having a half-width from approximately 345 nm to 395 nm and weighting using the daylight-typical standard light type D65.

This embodiment is even more effective in reducing bird strike. This advantageous effect is explained according to the present state of knowledge in that reflections in the BUVD wavelength range—contrary to the findings up to this point from the previously known prior art—can even have an attractive effect to birds. A lower BUVD reflectance difference is therefore particularly effective in preventing bird strike.

In a further advantageous embodiment, the first double cone reflectance is greater than the first BUVD reflectance.

In this way—contrary to the findings up to this point from the previously known prior art—bird strike is particularly effectively reduced, as experiments of the applicant have shown.

In a further advantageous embodiment, a double cone BUVD difference of the first double cone reflectance and the first BUVD reflectance is greater than or equal to 2%, preferably greater than or equal to 5%, particularly preferably greater than or equal to 10%, most preferably greater than or equal to 15%.

As mentioned above, reflections in the BUVD wavelength range can have an attractive effect on birds, due to which a lower BUVD reflectance reduces bird strike.

greater double cone-BUVD difference thus results in a strengthened visual perception of the optically structured element in the double cone wavelength range by means of the double cone sensory cells and thus reduces the probability of bird strike.

The double cone sensory cells of the bird eye perceive a wavelength range which is also perceptible to the human eye and extends from a blue to a red color impression. The optically structured element is thus also visually perceptible to a human in principle.

In a further preferred embodiment, in which in particular the second carrier sub-element is coated using the first carrier sub-element, the optically structured element includes a layer in the high-reflectivity region having an index of refraction between greater than or equal to 1.5 and less than or equal to 2.6, preferably between greater than or equal to 1.7 and less than or equal to 2.3, most preferably between greater than or equal to 1.9 and less than or equal to 2.2.

The index of refraction is preferably determined by spectral measurement in an ellipsometer and a subsequent model fit at a wavelength of 550 nm.

The layer of the high-reflectivity region can be made particularly thin due to an index of refraction in the above-mentioned value ranges, because of which the production costs are particularly low. Bird strike is particularly effectively prevented with this embodiment.

In a likewise preferred embodiment, the optically structured element includes a layer containing silicon nitride having a layer thickness of greater than or equal to 50 nm, preferably greater than or equal to 70 nm, particularly preferably greater than or equal to 80 nm, most preferably equal to 86 nm. The layer thickness is preferably less than or equal to 400 nm, particularly preferably less than or equal to 250 nm, most preferably less than or equal to 100 nm. The layer containing silicon nitride is preferably arranged in the high-reflectivity region, particularly preferably the layer containing silicon nitride forms the high-reflectivity region.

Such an optically structured element is particularly effective for preventing bird strike and moreover offers the advantage of low production costs.

In a further preferred embodiment, the optically structured element includes a plurality of low-reflectivity regions and high-reflectivity regions, in particular at least 10, preferably at least 20, more preferably at least 50 low-reflectivity regions and high-reflectivity regions. In particular, the low-reflectivity regions and high-reflectivity regions are arranged alternately, preferably as a strip pattern made of alternately arranged strips of high-reflectivity regions and low-reflectivity regions. In this embodiment, the carrier element is preferably a window, preferably a window 3 m to 0.5 m wide, particularly preferably a window 1.5 m to 0.8 m wide, most preferably a window 1 m wide.

The strips preferably have a width of 2 mm to 100 mm in a horizontal direction, the strips are particularly preferably formed as vertical strips oriented in a vertical direction. The vertical direction corresponds to the direction of gravity and the horizontal direction is perpendicular to the vertical direction.

Such strip patterns are particularly effective in reducing bird strike.

In one preferred embodiment, the double cone reflectance difference is greater than or equal to 10% and less than or equal to 30%. The VIS transmission ratio is preferably greater than or equal to 80% and less than or equal to 130%.

Such an optically structured element has proven to be particularly effective in reducing bird strike and moreover may be produced cost-effectively.

An optical system according to the invention comprises an optically structured element according to the invention, in which the carrier element includes a first carrier sub-element and a second carrier sub-element, preferably a glass or a film. In the optical system according to the invention, the first carrier sub-element is preferably arranged on the second carrier sub-element.

The advantages of reduced bird strike mentioned for the optically structured element according to the invention also result with the optical system according to the invention.

In one preferred embodiment, the optical system comprises a heat protection layer and/or a sun protection layer. The second carrier sub-element is preferably formed as an outer glass pane having an inside and the first carrier sub-element and the heat protection layer and/or the sun protection layer are arranged on the inside of the outer glass pane.

The optical system is thus equipped with additional functionalities, such as thermal-insulation properties and/or overheating protection. A protection against bird strike can thus be achieved in addition upon application of a heat protection layer.

In a further advantageous embodiment, the first carrier sub-element and the heat protection layer and/or the sun protection layer are arranged on an inside of an outer glass pane, thus in particular at a so-called position 2 of an insulation glazing.

The optical system is thus advantageously particularly cost-effective to produce and the heat protection layer and/or the sun protection layer is better protected from damage, for example due to weather influences. The protection against bird strike remains uniformly good or is only reduced slightly in this case.

In another preferred embodiment, the first carrier sub-element is arranged on an outside of an outer glass pane, a so-called position 1, and the heat protection layer is arranged at position 2. In this embodiment, the heat protection layer is particularly protected from damage and is thus particularly long-lived. In addition, the bird protective effect is improved.

According to the invention, the use of the optically structured element according to the invention is for attachment at or on an optical façade element, preferably a window or another façade glazing.

The above-mentioned advantages of reduced bird impact frequency on the optical façade element, thus reduced bird strike, result due to the use according to the invention.

Further advantages of the invention result on the basis of the advantageous embodiments described hereinafter.

In one advantageous embodiment, the first double cone reflectance is greater than the second double cone reflectance. A greater contrast thus advantageously results between the high-reflectivity region and the low-reflectivity region, by which bird strike is effectively reduced.

In one preferred embodiment, the first double cone reflectance is greater than or equal to 15%, preferably greater than or equal to 20%, particularly preferably greater than or equal to 25%. Bird strike is more effectively reduced by a greater first double cone reflectance.

In a further advantageous embodiment, the low-reflectivity region is preferably formed as a single pane of a multiple glass system. The second double cone reflectance, in particular of the single pane, is preferably less than or equal to 12%, preferably less than or equal to 9%. A high double cone reflectance difference can be achieved in an uncomplicated manner in this way.

In a further preferred embodiment, the high-reflectivity region and the low-reflectivity region are arranged adjoining one another, preferably adjacent to one another or one over another. Bird strike is more effectively reduced in this way.

In one particularly preferred embodiment, the optically structured element includes a layer, preferably in the high-reflectivity region, having an optical thickness of greater than or equal to 100 nm to less than or equal to 250 nm, preferably greater than or equal to 110 nm to less than or equal to 230 nm, particularly preferably greater than or equal to 130 nm to less than or equal to 210 nm, most preferably greater than or equal to 150 nm to less than or equal to 190 nm.

The optical thickness is the product of the index of refraction at 550 nm and the layer thickness. Optical thicknesses in the above-mentioned value ranges result in particularly low bird strike.

In one particularly preferred embodiment, the optically structured element includes a layer made of silicon nitride, preferably in the high-reflectivity region.

Silicon nitride is a particularly solid and hard material which is inert in relation to numerous chemicals and is thus particularly durable and long-lived. Moreover, silicon nitride has an index of refraction of 2.0 and is thus particularly well suitable for an optically structured element for reducing bird strike, as mentioned above.

In a further advantageous embodiment, the optically structured element includes, at least in the high-reflectivity region, a layer having a first dielectric. The optically structured element preferably includes, at least in the high-reflectivity region, a layer having a second dielectric. The first dielectric preferably has a lower index of refraction than the second dielectric. The second dielectric particularly preferably has an index of refraction of greater than or equal to 1.8 to less than or equal to 2.6, more preferably approximately 2.4. Most preferably the first dielectric has an index of refraction of greater than or equal to 1.3 to less than or equal to 2.2, more preferably approximately 2.0.

The first dielectric preferably includes a tin oxide, particularly preferably tin (IV) oxide $SnO_2$. The first dielectric preferably includes a zinc oxide (ZnO) and/or a tin-zinc mixed oxide ($SnZnO_x$). The second dielectric preferably includes titanium dioxide ($TiO_2$).

The above-mentioned dielectrics are inexpensive and robust and moreover have optical properties which are particularly suitable for the optically structured element.

In one particularly advantageous embodiment, the optically structured element comprises, preferably in the high-reflectivity region, a first layer having a layer thickness of preferably 160 nm, the first layer particularly preferably contains the first dielectric. The optically structured element preferably comprises a second layer having a layer thickness of preferably 190 nm, the second layer particularly preferably contains the second dielectric.

The optically structured element having the above-mentioned layer sequence of the first layer and the second layer has particularly good effectiveness against bird strike.

The optically structured element preferably comprises a third layer having a layer thickness of preferably 220 nm, wherein the second layer is arranged between the first layer and the third layer, the third layer particularly preferably contains the first dielectric. The optically structured element most preferably comprises a fourth layer having a layer thickness of preferably 190 nm, wherein the third layer is arranged between the second layer and the fourth layer, the fourth layer preferably contains the second first dielectric. Furthermore, the optically structured element preferably comprises a fifth layer having a layer thickness of preferably 160 nm, wherein the fourth layer is arranged between the third layer and the fifth layer, the fifth layer particularly preferably contains the first dielectric.

The optically structured element having a layer sequence of the above-mentioned layers has extraordinarily good effectiveness against bird strike and is moreover particularly robust and inexpensive to produce.

The optically structured element preferably comprises a sixth layer having a layer thickness of preferably 150 nm, wherein the fifth layer is arranged between the fourth layer and the sixth layer, the sixth layer particularly preferably contains silicon dioxide ($SiO_2$).

The sixth layer advantageously acts as an antireflection layer and is moreover used to protect the underlying layers from mechanical stress and abrasion. Furthermore, the anti-reflection layer advantageously reduces a broadband reflection, but hardly influences a narrowband reflection, in particular in the double cone wavelength range.

In a further advantageous embodiment, the low-reflectivity region includes a layer which does not include silicon nitride or titanium dioxide, in particular the low-reflectivity region is preferably formed from soda-lime glass. The optically structured element may be produced particularly inexpensively by way of this embodiment.

The optically structured element preferably comprises at least one area of high surface density and at least one area of low surface density, the optically structured element particularly preferably comprises at least one area of moderate surface density. In the area of high surface density, a quotient of the summed surface-related proportion of the high-reflectivity regions in relation to the summed surface-related proportion of the low-reflectivity regions is preferably greater than the quotient in the area of moderate surface density, which has a correspondingly greater quotient than the area of low surface density.

A design less visually noticeable to the observer may be achieved by providing areas of high and low surface density.

In one preferred embodiment, the optically structured element comprises multiple high-reflectivity regions in the form of circular areas, which are arranged on an otherwise uncoated or uniformly coated low-reflectivity region, wherein preferably the spacing of the circular areas is less in the area of high surface density than in the area of low surface density.

This embodiment is particularly effective in reducing bird strike and is cost-effective to produce.

In one advantageous embodiment, the optically structured element comprises a high-reflectivity region having at least one sawtooth curve edge, preferably a strip shaped high-reflectivity region having sawtooth curve edge. Bird strike is thus particularly effectively prevented and a reduction of the overall reflection is achieved at the edges of the high-reflectivity region due to the sawtooth curve-shaped design. Moreover, a contour of the strip shape is advantageously blurred by the sawtooth curve-shaped design of the area of the strip-shaped high-reflectivity region, due to which the high-reflectivity region is less noticeable to humans at the edges, in particular upon observation in transmission.

In a further preferred embodiment, the optically structured element comprises at least one further sawtooth strip-shaped area of the high-reflectivity region. Two sawtooth strip-shaped areas adjoining one another preferably have a spacing. The area of high surface density particularly preferably has a smaller spacing of the sawtooth strip-shaped areas than the area of low surface density.

This embodiment is particularly effective in reducing bird strike and inexpensive to produce.

In one preferred embodiment, the first carrier sub-element is arranged between the heat protection layer and the sun protection layer and the second carrier sub-element. In an alternative embodiment, the first carrier sub-element is arranged on the heat protection layer and/or on the sun protection layer.

The simple use of the optically structured element in insulating glazings is thus advantageously enabled, wherein the first carrier sub-element is preferably arranged on an inside of an outer glass pane, thus at position 2. A glass pane is thus advantageously equipped with bird protection functionality and sun/heat protection.

In a further alternative embodiment, the second carrier sub-element is arranged between the first carrier sub-element and the heat protection layer and/or the sun protection layer.

In this embodiment, the optically structured element is particularly protected from weather influences and is thus particularly long-lived.

In one preferred production method in the scope of this invention, the optically structured element is produced by a vacuum coating method of the carrier element, by means of physical vapor deposition (PVD), vapor deposition, or chemical vapor deposition (CVD) on the carrier element.

These production methods enable a simple, inexpensive, and high-quality manufacturing of the optically structured element.

The high-reflectivity regions and low-reflectivity regions preferably form patterns. The patterns are preferably produced by coating, masks, or in a liftoff method using imprinted masks, by laser ablation or laser structuring, particularly preferably by screen printed or digitally printed masks, which are removed after the vacuum coating in solvents or by subsequent thermal incineration. The glass is advantageously thermally tempered at the same time during the incineration. Advantageously, the surface density of the high-reflectivity region is gradually adjusted in a simple manner during the screen printing or digital printing or the laser structuring.

Carrier elements, such as glasses, coated with patterns are producible particularly inexpensively, effective in reducing bird strike, and visually appealing to humans.

The patterns are preferably created by a full-surface coating of a film, subsequent cutting of the film, and subsequent laminating on or laminating in of the film, in particular of film parts, on a glass or a further film. The film is particularly preferably adhesively bonded on a window glass already installed in a building. In particular, the film corresponds here to the first carrier sub-element and the window glass corresponds to the second carrier sub-element. This production method of a coated second carrier sub-element is particularly simple and inexpensive.

BRIEF DESCRIPTION OF THE DRAWINGS

Further properties and advantages of the invention result from the following description with reference to exemplary embodiments and with reference to the drawings.

DETAILED DESCRIPTION

Identical reference signs used in the figures designate identical or at least identically-acting elements.

Figure 1:
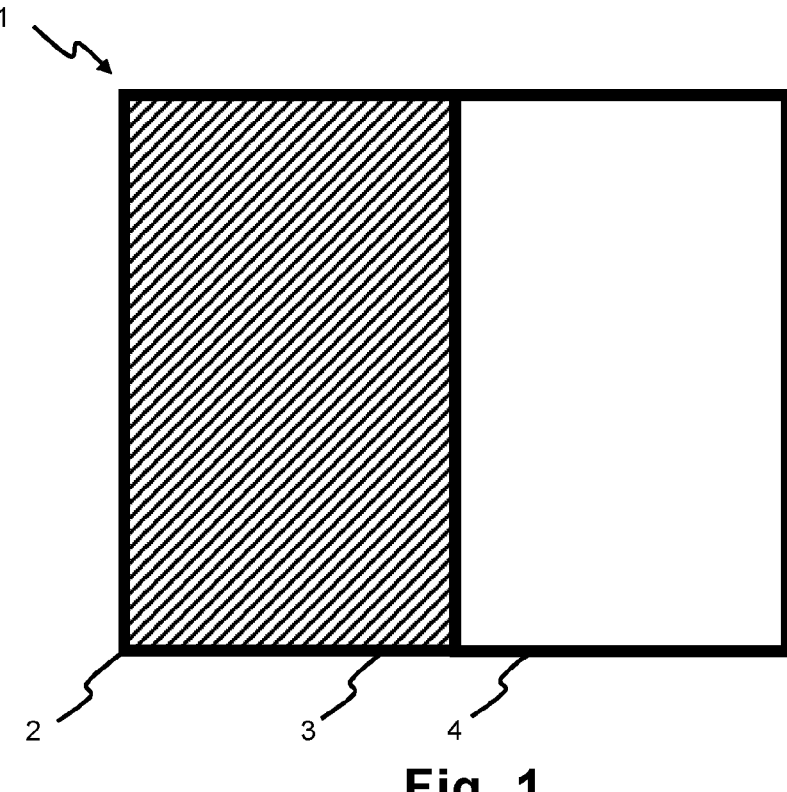
FIG. 1 shows a first exemplary embodiment of an optically structured element according to the invention.

FIG. 1 shows an optically structured element 1 having a carrier element 2. The optically structured element 1 comprises a high-reflectivity region 3 and a low-reflectivity region 4. The high-reflectivity region 3 and the low-reflectivity region 4 are arranged adjoining one another in the example of FIG. 1.

Figure 10:
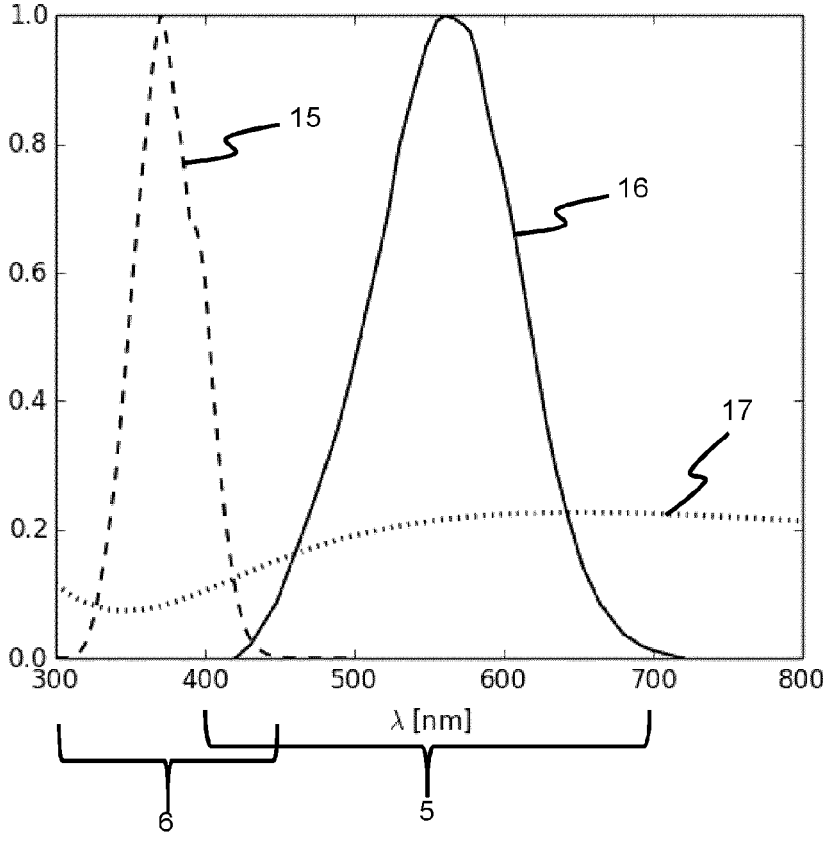
FIG. 10 shows a diagram which describes the optical properties of an optical system, in which the high-reflectivity region includes a silicon nitride single layer.

The optically structured element 1 has, in the high-reflectivity region 3, a first double cone reflectance in a double cone wavelength range 5 (not shown here, cf. FIG. 10). The double cone wavelength range 5 is between greater than or equal to 400 nm and less than or equal to 700 nm. The optically structured element 1 has, in the low-reflectivity region 4, a second double cone reflectance in the double cone wavelength range 5. A double cone reflectance difference ADZ (cf. FIG. 12) of the first double cone reflectance and the second double cone reflectance is equal to 13% in the exemplary embodiment of FIG. 1.

In a further exemplary embodiment (not shown), which comprises all features of the exemplary embodiment of FIG. 1, the optically structured element 1 has, in the high-reflectivity region 3, a first BUVD reflectance in a BUVD wavelength range 6 (not shown here, cf. FIG. 12) and, in the low-reflectivity region 4, a second BUVD reflectance in the BUVD wavelength range 6. A BUVD reflectance difference of the first BUVD reflectance and the second BUVD reflectance is less than or equal to 5%.

The first double cone reflectance is greater than the first BUVD reflectance. A first double cone-BUVD difference of the first double cone reflectance and the first BUVD reflectance is greater than or equal to 10% here.

The optically structured element 1 has, in the high-reflectivity region 3, a first VIS transmittance in a VIS wavelength range and, in the low-reflectivity region 4, a second VIS transmittance in the VIS wavelength range. A VIS transmission ratio $QT_{vis}$ (cf. FIG. 12) of the first VIS transmittance and the second VIS transmittance is approximately 86%.

A color distance $\Delta E$ (cf. FIG. 12) between the high-reflectivity region 3 and the low-reflectivity region 4 is 6.9.

The optically structured element 1 includes, in the high-reflectivity region 3, a layer having an index of refraction of 2.0 at 550 nm.

Figure 2:
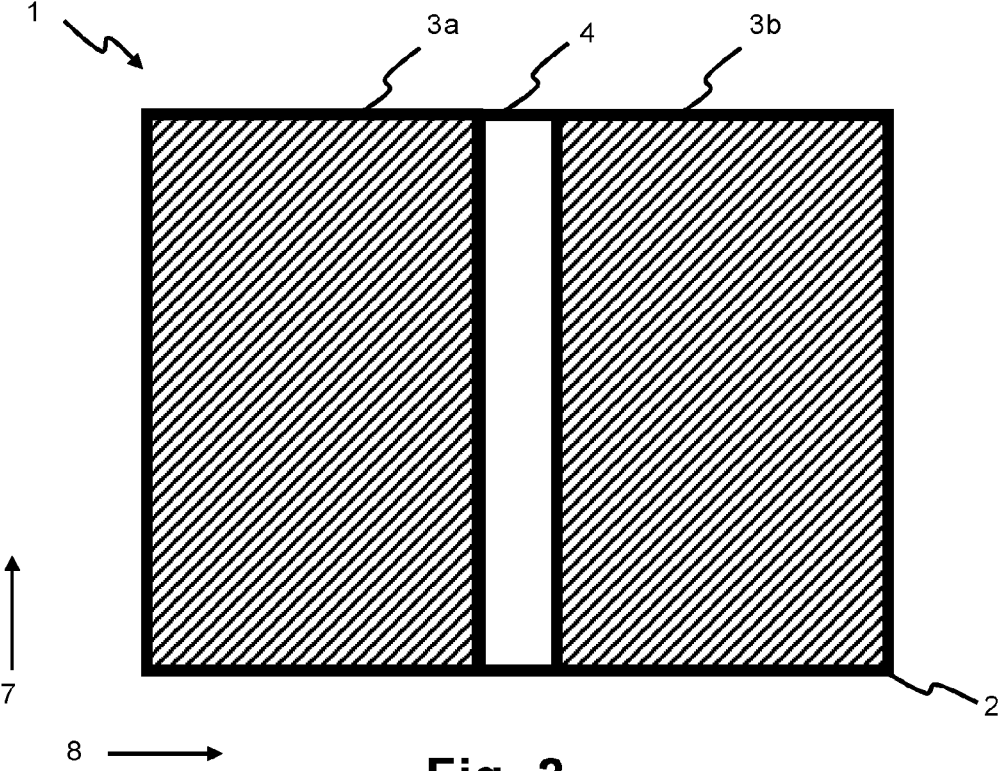
FIG. 2 shows a second exemplary embodiment of an optically structured element according to the invention having a first and a second high-reflectivity region.

FIG. 2 shows a further exemplary embodiment of an optically structured element 1, in which the high-reflectivity region 3 (cf. FIG. 1) comprises a first high-reflectivity region 3a and a second high-reflectivity region 3b. The low-reflectivity region 4 is arranged between the first high-reflectivity region 3a and the second high-reflectivity region 3b. The high-reflectivity regions 3a, 3b and the low-reflectivity region 4 have an equal extension in a vertical direction 7 and have a differing extension in a horizontal direction 8. The extension of the high-reflectivity regions 3a, 3b in the horizontal direction 8 is greater here than the extension of the low-reflectivity region 4 in the horizontal direction 8. The high-reflectivity regions 3a, 3b and the low-reflectivity region 4 thus form a strip pattern, which comprises strips oriented in the vertical direction 7.

The vertical direction 7 and the horizontal direction 8 are arranged orthogonally to one another. The vertical direction 7 corresponds to the direction of gravity.

In the exemplary embodiment of FIG. 2, the low-reflectivity region 4 comprises an area less than or equal to 100 cm 2.

Figure 3:
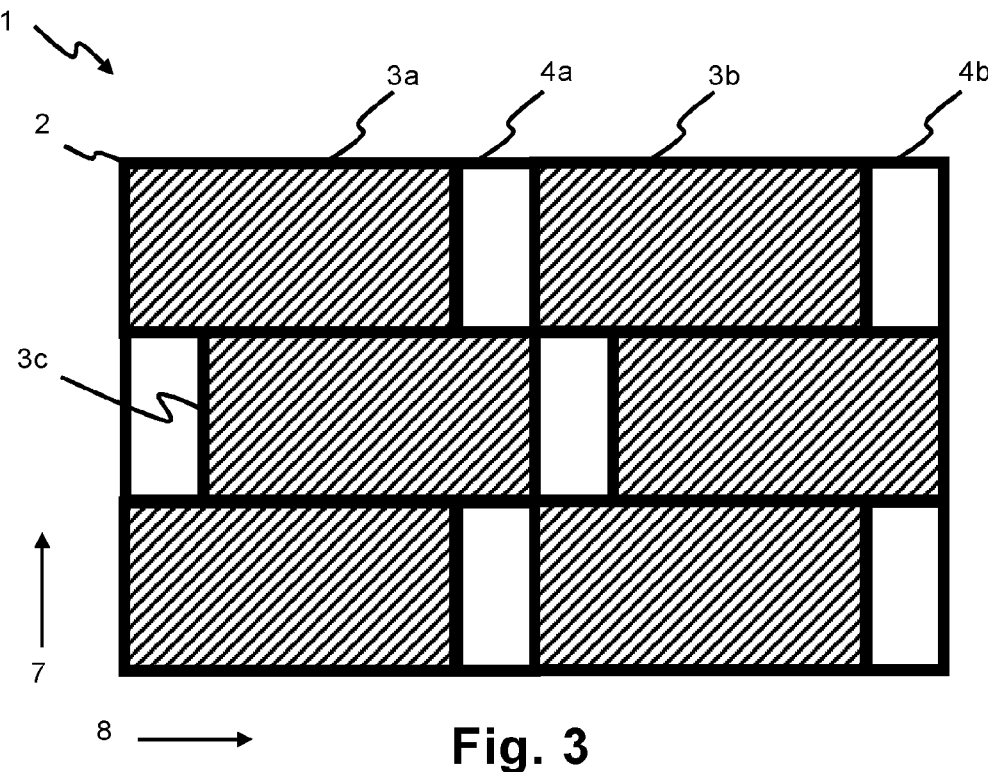
FIG. 3 shows a further exemplary embodiment of the optically structured element according to the invention having multiple high-reflectivity and low-reflectivity regions adjoining one another.

FIG. 3 shows a further exemplary embodiment of an optically structured element 1, in which the low-reflectivity region 4 comprises a first low-reflectivity region 4a and a second low-reflectivity region 4b. The high-reflectivity region 3 comprises a first high-reflectivity region 3a, a second high-reflectivity region 3b, and a third high-reflectivity region 3c.

The first low-reflectivity region 4a is arranged between the first high-reflectivity region 3a and the second high-reflectivity region 3b. The third high-reflectivity region 3c is arranged in the vertical direction 7 below the first low-reflectivity region 4a. An alternating sequence of the high-reflectivity regions 3 and the low-reflectivity regions 4 thus results in the vertical direction 7 and in the horizontal direction 8. The alternating sequence of high-reflectivity regions 3 and low-reflectivity regions 4 results in a repeating pattern.

In a further exemplary embodiment (not shown here), the high-reflectivity regions 3 and the low-reflectivity regions 4 are arranged in irregular sequences.

In still a further exemplary embodiment (not shown here), the high-reflectivity regions 3 and the low-reflectivity regions 4 are arranged in the form of a company logo.

Figure 4:
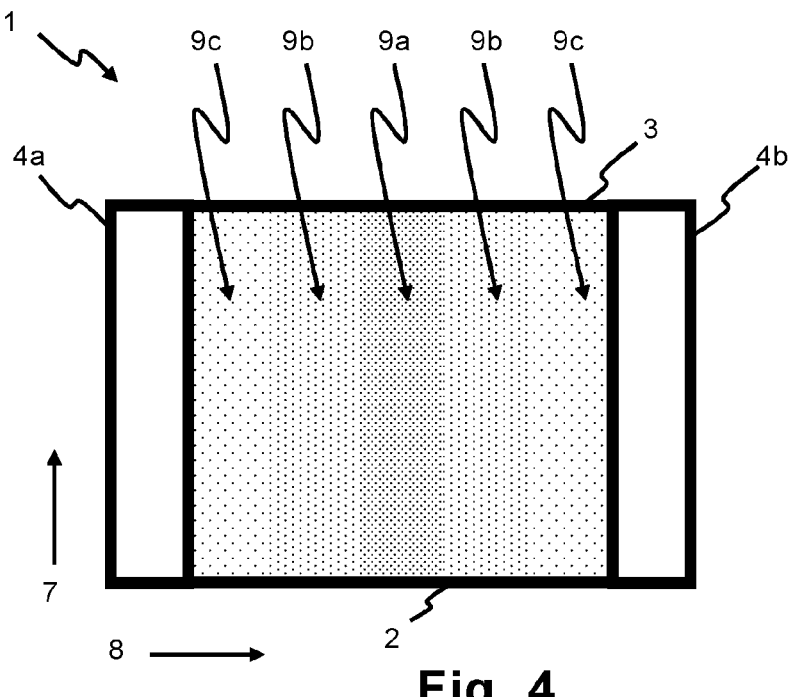
FIG. 4 shows a further exemplary embodiment having circular areas of the high-reflectivity region.

FIG. 4 shows a further exemplary embodiment of an optically structured element 1, in which the high-reflectivity region 3 and the low-reflectivity regions 4a, 4b form a vertical strip pattern. The high-reflectivity region 3 and the low-reflectivity region 4 have a greater extension in the vertical direction 7 than in the horizontal direction 8. The high-reflectivity region 3 comprises an area of high surface density 9a, two areas of moderate surface density 9b, and two areas of low surface density 9c. The area of high surface density 9a is arranged between the two areas of moderate surface density 9b. The two areas of moderate surface density 9b are each arranged between the area of high surface density 9a and the adjoining areas of low surface density 9c. The two areas of low surface density 9c are each arranged between the adjoining areas of moderate surface density 9b and the adjoining low-reflectivity regions 4a, 4b.

The high-reflectivity region 3 comprises circular areas, which are shown as dots in FIG. 4. The circular areas are spaced apart from one another in both the vertical direction 7 and the horizontal direction 8. In the area of the high surface density 9a, the spacing of two circular areas is greater than in the area of moderate surface density 9b. The spacing of two circular areas in the area of moderate surface density 9b is in turn less than that in the area of low surface density 9c.

In a further exemplary embodiment (not shown), the area of high surface density 9a corresponds to a continuously coated area. The circular areas overlap in all directions in this case, so that a continuous layer results.

Figure 5:
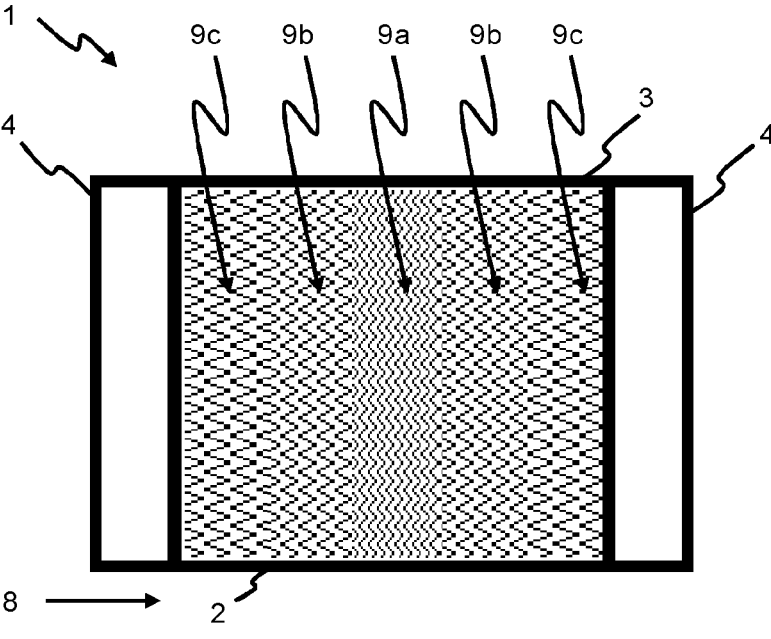
FIG. 5 shows a further exemplary embodiment having sawtooth curve-shaped areas of the high-reflectivity region.

FIG. 5 shows a further exemplary embodiment of an optically structured element 1, in which the high-reflectivity region 3 comprises sawtooth curve-shaped areas. Two sawtooth curve-shaped area regions adjacent to one another have a spacing in the horizontal direction 8 which is greater in the area of high surface density 9a than in the area of moderate surface density 9b. In the area of moderate surface density 9b, the spacing in the horizontal direction 8 is in turn greater than in the area of low surface density 9c.

In a further exemplary embodiment (not shown), the high-reflectivity region comprises only one single sawtooth curve-shaped area, in particular an area having at least one sawtooth curve edge.

Figure 6A:
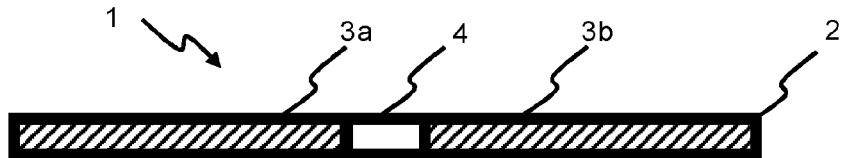
FIG. 6A shows an optically structured element having a first and a second high-reflectivity region.

FIG. 6A shows an optically structured element 1 having a first high-reflectivity region 3a, a second high-reflectivity region 3b, and a carrier element 2. The carrier element 2 can be designed as a film, for example, and can be adhesively bonded on a window glass.

In a further exemplary embodiment (not shown), the high-reflectivity regions 3a, 3b again include silicon nitride, whereas the low-reflectivity region 4 is formed solely from the film, thus without silicon nitride.

Figure 6B:
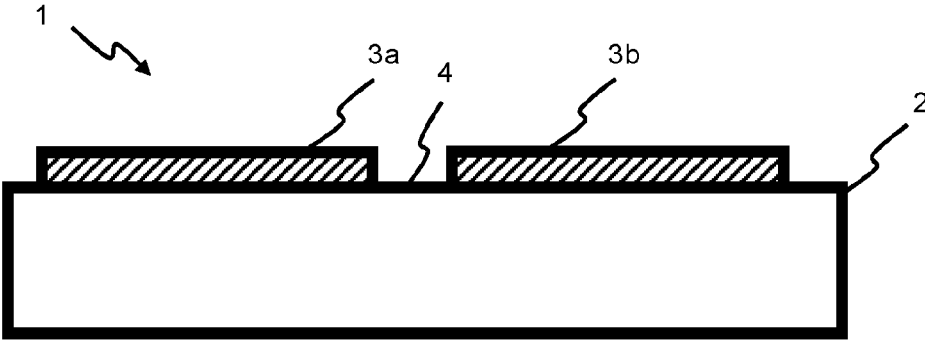
FIG. 6B shows an optically structured element, in which the high-reflectivity region is arranged on the low-reflectivity region.

FIG. 6B shows an optically structured element 1, in which the first high-reflectivity region 3a and the second high-reflectivity region 3b are arranged on the low-reflectivity region 4. The low-reflectivity region 4 corresponds here to a conventional soda-lime glass or a conventional film transparent in the VIS wavelength range. The low-reflectivity region 4 is coated using the high-reflectivity regions 3a, 3b.

In a further exemplary embodiment (not shown), the high-reflectivity region 3 is coated using the low-reflectivity region 4 or using multiple low-reflectivity regions.

Figure 6C:
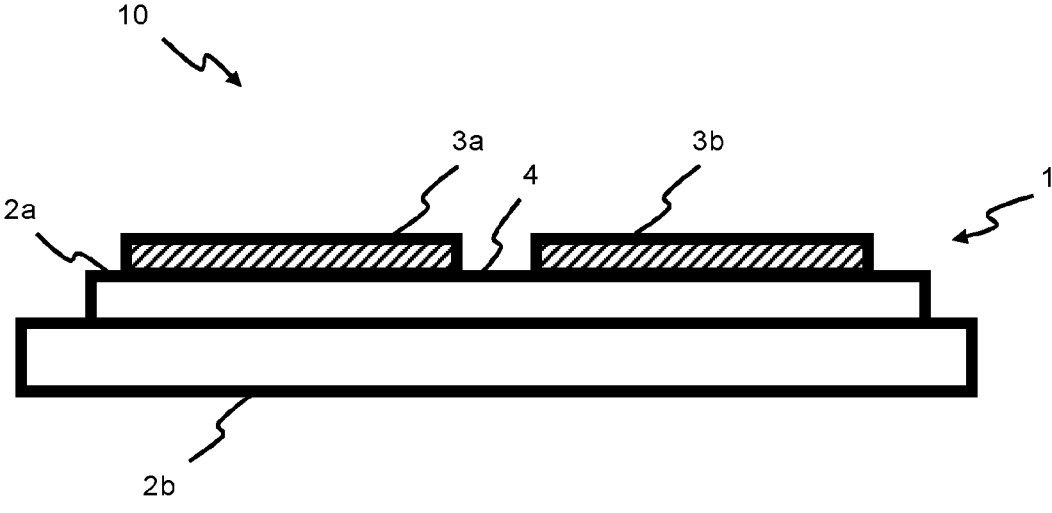
FIG. 6C shows an optical system in which a first carrier sub-element is arranged on a second carrier sub-element.

FIG. 6C shows an optical system 10 in which the carrier element 2 includes a first carrier sub-element 2a and a second carrier sub-element 2b. The optically structured element 1 corresponds to that of FIG. 6B. The second carrier sub-element 2b corresponds to a window glass, in particular a soda-lime glass. In particular, the low-reflectivity region 4 corresponds to a surface of the uncoated second carrier sub-element 2b visible in a top view.

Figure 6D:
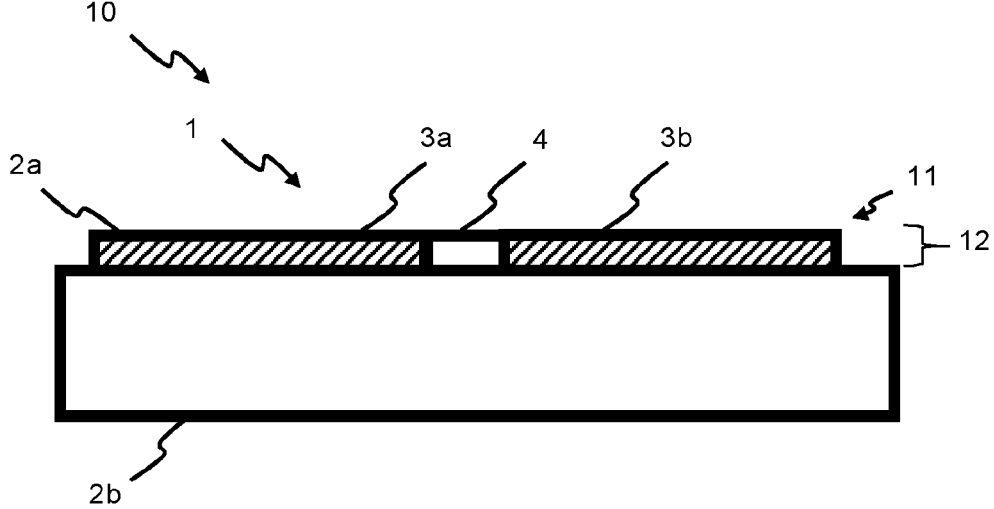
FIG. 6D shows a first exemplary embodiment of an optical system having a layer containing silicon nitride.

FIG. 6D shows an optical system 10, in which the second carrier sub-element 2b is coated using the first carrier sub-element 2a. The second carrier sub-element 2b is a coated window glass made of soda-lime glass in this exemplary embodiment. The high-reflectivity region 3 includes a single layer 11 containing silicon nitride having a layer thickness 12 of 86 nm.

The low-reflectivity region 4 comprises a layer made of uncoated soda-lime glass here. The low-reflectivity region 4 is preferably formed from soda-lime glass. The low-reflectivity region 4 can preferably also correspond to the uncoated carrier element 2.

Figure 6E:
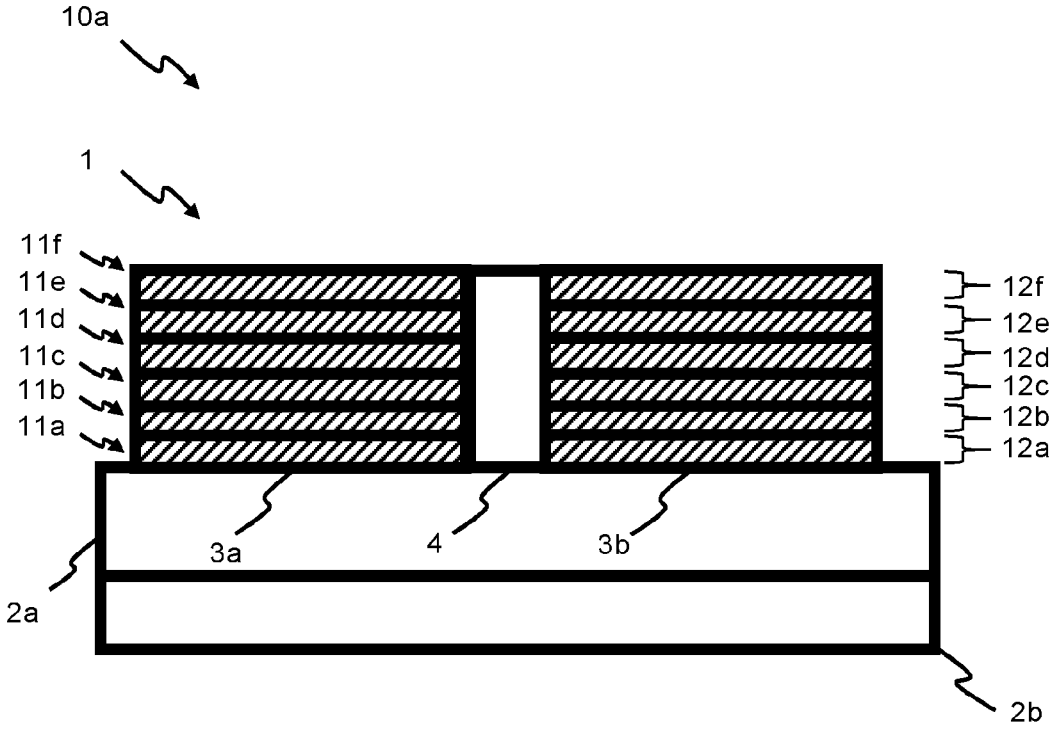
FIG. 6E shows a first optical system.

FIG. 6E shows a first optical system 10a, which includes the following layer structure:

A first layer 11 having a first dielectric made of silicon nitride and having a layer thickness 12a of 160 nm is arranged on the first carrier sub-element 2a. A second layer 11b having a second dielectric made of titanium dioxide and having a layer thickness 12b of 190 nm is arranged on this first layer 11a. A third layer 11c, which includes the first dielectric, is arranged on the second layer 11b. The third layer 11c has a layer thickness 12c of 220 nm. A fourth layer 11d having a layer thickness 12d of 190 nm, which includes the second dielectric, is arranged on the third layer 11c. A fifth layer 11e having a layer thickness 12e of 160 nm, which includes the first dielectric, is arranged on the fourth layer 11d. A sixth layer 11f, which has a thickness 12f of 150 nm and consists of silicon dioxide, is arranged on the fifth layer 11e.

Figures 11, 12:
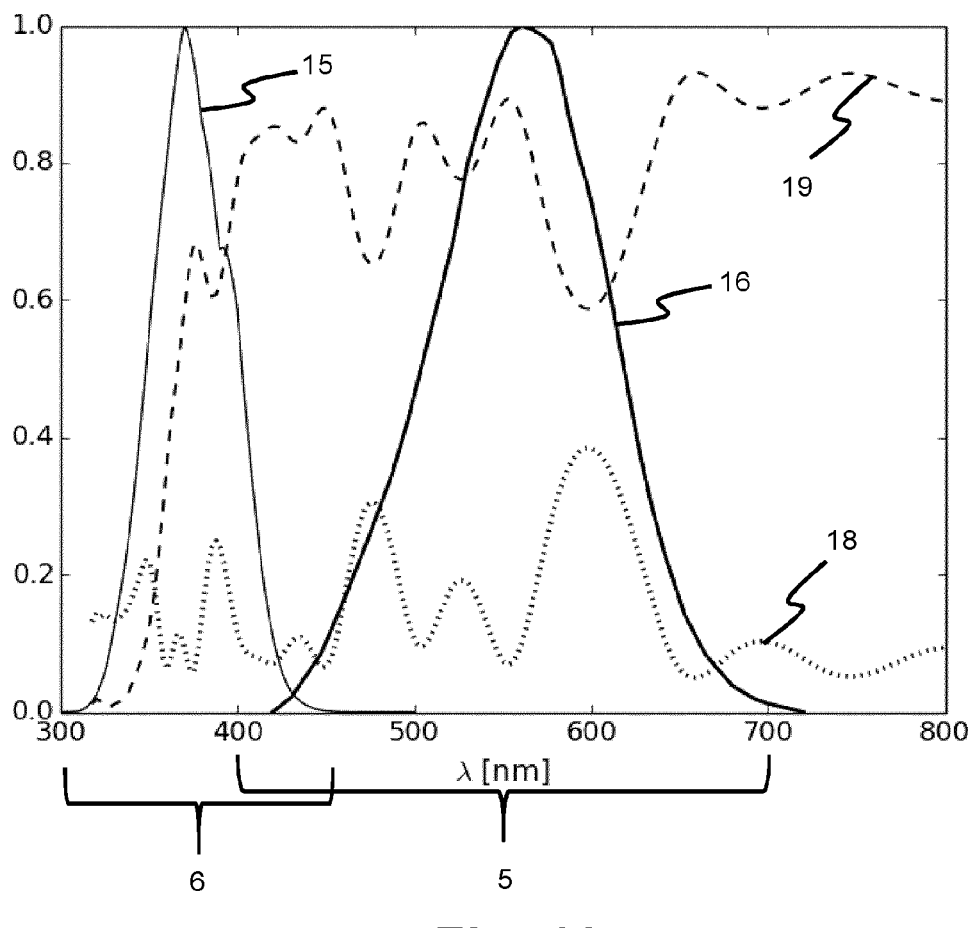
FIG. 11 shows a diagram which describes the optical properties of the first optical system.
FIG. 12 shows a table having optical parameters of two optical systems.

The optical properties of the first optical system 10a are summarized in the table of FIG. 12.

Figure 7:
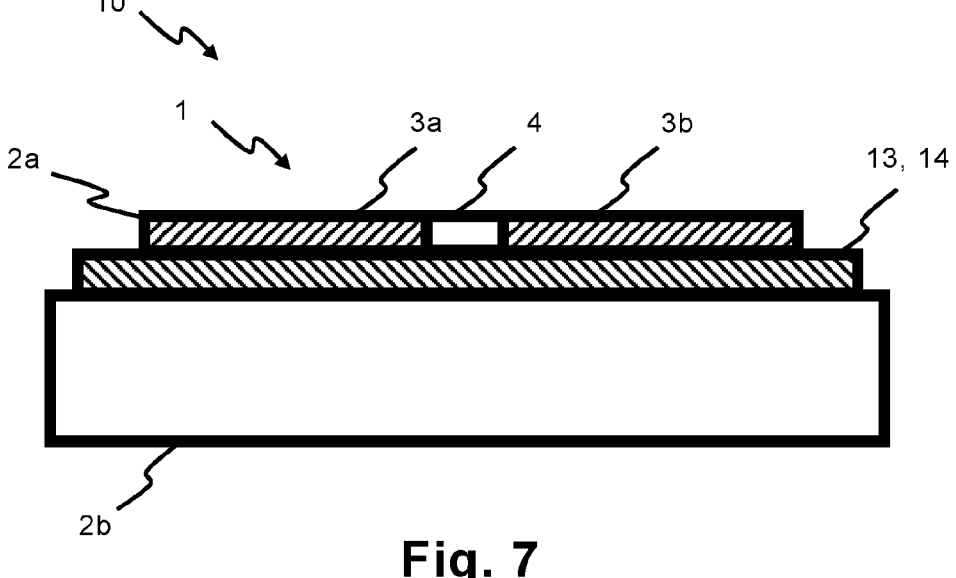
FIG. 7 shows a further exemplary embodiment of an optical system having a heat protection layer and/or a sun protection layer.

FIG. 7 shows a further exemplary embodiment of an optical system 10, in which a heat protection layer 13 and/or a sun protection layer 14 is arranged between the first carrier sub-element 2a and the second carrier sub-element 2b.

Figure 8:
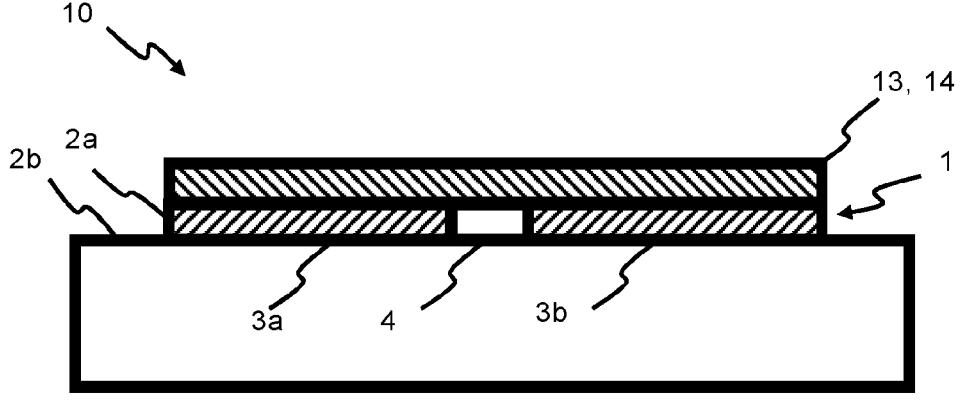
FIG. 8 shows an alternative exemplary embodiment of an optical system having a heat protection layer and/or a sun protection layer.

FIG. 8 shows an alternative exemplary embodiment of an optical system 10, in which the first carrier sub-element 2a is arranged between the heat protection layer 13 and/or the sun protection layer 14 and the second carrier sub-element 2b.

Figure 9:
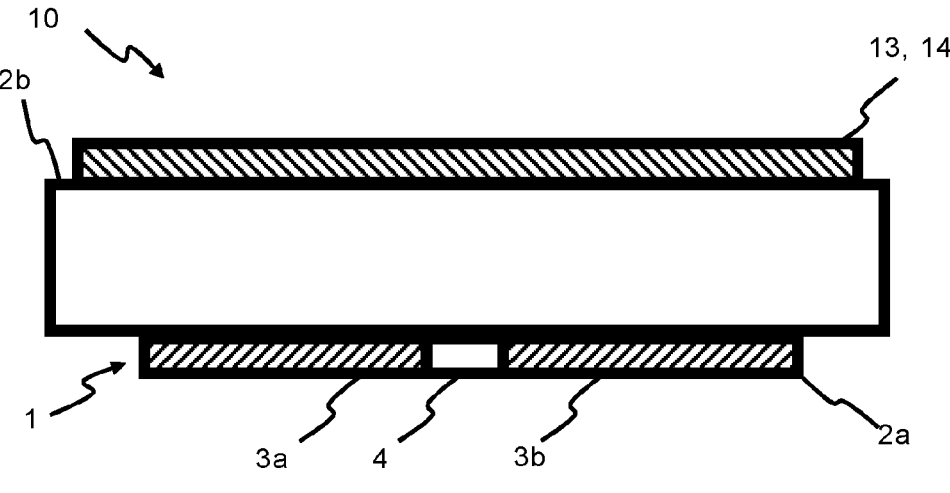
FIG. 9 shows a further exemplary embodiment of an optical system having a heat protection layer and/or a sun protection layer.

FIG. 9 shows a further alternative exemplary embodiment of an optical system 10, in which the second carrier sub-element 2b is arranged between the heat protection layer 13 and/or the sun protection layer 14 and the first carrier sub-element 2a.

In the exemplary embodiment of FIG. 9, the second carrier sub-element 2b corresponds to a window glass, wherein the first carrier sub-element 2a is arranged on an outside of the window glass. The heat protection layer 13 and/or the sun protection layer 14 are accordingly arranged on an inside of the window glass facing toward an interior.

In a further exemplary embodiment (not shown), a multi-pane insulating glass structure is used. The first carrier sub-element 2a is arranged here on the first glass surface counting from the outside, the so-called position 1. The heat protection layer 13 and/or the sun protection layer 14 is arranged on a second glass surface facing toward the pane intermediate space, the so-called position 2.

FIG. 10 shows a diagram which describes the optical properties of the optical system 10, in which the high-reflectivity region 3 includes a single layer 11 containing silicon nitride (not shown here, cf. FIG. 6d). The wavelength A in nanometers is shown on the abscissa of the diagram and the double cone wavelength range 5 and the BUVD wavelength range 6 are identified. Scaled values of a relative sensitivity of sensory cells of a bird eye for a BUVD65 spectrum 15 and an Osorio99D65 spectrum 16 are plotted on the ordinate. Moreover, scaled values of a reflection spectrum 17 of the high-reflectivity region 3 of the optically structured element 1 of the optical system 10 are plotted on the ordinate. The low-reflectivity region 4 preferably has a wavelength-constant reflection of approximately 8% and particularly preferably a wavelength-constant transmission of approximately 92%.

The BUVD65 spectrum 15 is used for weighting measured BUVD reflectances, as described above. The Osorio99D65 spectrum 16 is used for weighting measured double cone reflectances and is also known from the above-mentioned publication of Osorio et al.

The reflection spectrum 17 was determined by reflection measurements on the optical system 10. It is apparent from the values of the reflection spectrum 17 that the first double cone reflectance is greater than the first BUVD reflectance.

FIG. 11 shows a diagram which describes the optical properties of the first optical system 10a (not shown here, cf. FIG. 6E). In the diagram, a reflection spectrum 18 and a transmission spectrum 19 of the first optical system 10a are shown, in particular of the high-reflectivity region 3 of the first optical system 10a.

The reflection spectrum 18 of FIG. 11 comprises multiple local extreme values and thus has a more complex profile than the reflection spectrum 17 of FIG. 10. It is apparent from the reflection spectrum 18 that the reflection in the double cone wavelength range 5 is greater than the reflection in the BUVD wavelength range 6.

Accordingly, the first double cone reflectance is greater than the first BUVD reflectance.

A transmission spectrum 19 of the optically structured element 1 in the high-reflectivity region 3 in the VIS wavelength range only deviates slightly from a transmission spectrum in the low-reflectivity region 4, which results in a large VIS transmission ratio $QT_{vis}$ and a small color distance E.

FIG. 12 shows a tabular summary of the optical parameters of conventional soda-lime glass (first line), of the optical system 10 of FIG. 6d (second line), and of the first optical system 10a (third line). In this case, $T_{vis}$ designates the transmission in the VIS wavelength range; the parameters L*, a*, and b* designate parameters of a L*a*b* color space. The parameter L* corresponds to a brightness value. The parameter a* specifies a color type and color intensity between green and red. The parameter b* specifies a color type and color intensity between blue and yellow. The L*a*b* color space is previously known and normed from EN ISO 11664-4 "Colorimetry-Part 4: CIE 1976 L*a*b* colour space".

The column Osorio99D65 specifies the first double cone reflectance in the double cone wavelength range 5. The column BUVD65 specifies the first BUVD reflectance in the BUVD wavelength range. The column ΔDZ specifies the double cone reflectance difference ADZ of the first double cone reflectance and the second double cone reflectance. The column ΔE specifies the color distance between the high-reflectivity region 3 and the low-reflectivity region 4. The color distance ΔE is determined by means of the above-mentioned parameters L*, a*, and b*.

As is apparent from the numeric values of the table in FIG. 12, the first double cone reflectances of the optical system 10 and the first optical system 10a are greater than the first BUVD reflectances of the corresponding optical systems 10, 10a. The double cone reflectance differences ADZ of the optical systems 10, 10a are greater than or equal to 10% and the color distances ΔE of the optical systems 10, 10a are less than 8.

LIST OF REFERENCE SIGNS

1 optically structured element
2 carrier element
2a first carrier sub-element
2b second carrier sub-element
3 high-reflectivity region
3a first high-reflectivity region
3b second high-reflectivity region
3c third high-reflectivity region
4 low-reflectivity region
4a first low-reflectivity region
4b second low-reflectivity region
5 double cone wavelength range
6 BUVD wavelength range
7 vertical direction
8 horizontal direction
9a area of high surface density
9b area of moderate surface density
9c area of low surface density
10 optical system
10a first optical system
11 layer
11a-f layers
12 layer thickness
12a-f further layer thicknesses
13 heat protection layer
14 sun protection layer
15 BUVD65 spectrum
16 Osorio99D65 spectrum
17 reflection spectrum of the high-reflectivity region of 10
18 reflection spectrum of the high-reflectivity region of 10a
19 transmission spectrum of the high-reflectivity region of 10a
ΔDZ double cone reflectance difference
$T_{vis}$ transmission in the VIS wavelength range
$QT_{vis}$ VIS transmission ratio
L* brightness value
a* color type and color intensity between green and red
b* color type and color intensity between blue and yellow
ΔE color distance

The invention claimed is:

1. An optically structured element (1), for minimizing or preventing bird collisions, comprising:
  at least one carrier element (2);
  at least one high-reflectivity region (3); and
  at least one low-reflectivity region (4);
  the carrier element (2) includes at least one of
    a) the at least one high-reflectivity region (3) or
    b) the at least one low-reflectivity region (4);
  the high-reflectivity region (3) has a first double cone reflectance in a double cone wavelength range (5) and a first visible light (VIS) transmittance in a VIS wavelength range;

the low-reflectivity region (4) has a second double cone reflectance in the double cone wavelength range (5) and a second VIS transmittance in the VIS wavelength range;
  the double cone wavelength range (5) is between greater than or equal to 400 nm and less than or equal to 700 nm;
  the VIS wavelength range is between greater than or equal to 380 nm and less than 780 nm;
  a double cone reflectance difference of the first double cone reflectance and the second double cone reflectance is greater than or equal to 5%; and
  a VIS transmission ratio of the first VIS transmittance and the second VIS transmittance is greater than or equal to 70% and less than or equal to 200%.

2. The optically structured element (1) as claimed in claim 1, wherein the first and the second double cone reflectance of the optically structured element are each determined by reflection measurements in the double cone wavelength range and weighting using an Osorio99D65 spectrum.

3. The optically structured element (1) as claimed in claim 1, wherein a color distance (ΔE), determined for transmission in the VIS wavelength range between the high-reflectivity region (3) and the low-reflectivity region (4), is less than or equal to 20.

4. The optically structured element (1) as claimed in claim 1, wherein the at least one high-reflectivity region (3) and the at least one low-reflectivity region (4) are arranged adjoining one another.

5. The optically structured element (1) as claimed in claim 1, wherein the at least one high-reflectivity region (3) is configured such that a circular area having a diameter of 15 cm is not arrangeable completely within the high-reflectivity region (3) and the at least one low-reflectivity region (4) is configured such that another circular area having a diameter of 15 cm is not arrangeable completely within the low-reflectivity region (4).

6. The optically structured element (1) as claimed in claim 1, wherein
  the high-reflectivity region (3) has a first bird ultraviolet/violet band (BUVD) reflectance in a BUVD wavelength range (6);
  the BUVD wavelength range (6) is between greater than or equal to 300 nm and less than or equal to 450 nm; and
  the first double cone reflectance is greater than the first BUVD reflectance.

7. The optically structured element (1) as claimed in claim 1, wherein
  the high-reflectivity region (3) has a first BUVD reflectance in a BUVD wavelength range (6);
  the BUVD wavelength range (6) is between greater than or equal to 300 nm and less than or equal to 450 nm; and
  a first double cone-BUVD difference of the first double cone reflectance and the first BUVD reflectance is greater than or equal to 2%.

8. The optically structured element (1) as claimed in claim 1, wherein
  the high-reflectivity region (3) has a first BUVD reflectance in a BUVD wavelength range (6);
  the low-reflectivity region (4) has a second BUVD reflectance in the BUVD wavelength range;
  the BUVD wavelength range (6) is between greater than or equal to 300 nm and less than or equal to 450 nm; and a BUVD reflectance difference of the first BUVD reflectance and the second BUVD reflectance is less than or equal to 20%.

9. The optically structured element (1) as claimed in claim 1, wherein at least one of a) the high-reflectivity region (3) includes a layer having an index of refraction between greater than or equal to 1.5 and less than or equal to 2.6, or b) the high-reflectivity region (3) includes a layer containing silicon nitride having a layer thickness of greater than or equal to 50 nm.

10. The optically structured element (1) as claimed in claim 1, wherein the at least one low-reflectivity region comprises a plurality of low-reflectivity regions (4), the at least one high-reflectivity region comprises high-reflectivity regions (3), and the low-reflectivity regions (4) and high-reflectivity regions (3) are arranged alternating.

11. The optically structured element (1) as claimed in claim 1, wherein the double cone reflectance difference is greater than or equal to 10% and less than or equal to 30%.

12. The optically structured element (1) as claimed in claim 1, wherein the VIS transmission ratio is greater than or equal to 80% and less than or equal to 130%.

13. An optical system (10), comprising:

the optically structured element (1) as claimed in claim 1, wherein the at least one carrier element (2) includes a first carrier sub-element (2a) and a second carrier sub-element (2b); and the first carrier sub-element (2a) is arranged on the second carrier sub-element (2b).

14. The optical system (10) as claimed in claim 13, further comprising at least one of a heat protection layer (13) or a sun protection layer (14);

the second carrier sub-element (2b) comprises an outer glass pane having an inside, and the first carrier sub-element (2a) and the at least one of the heat protection layer (13) or the sun protection layer (14) are arranged on the inside of the outer glass pane.

15. The optically structured element (1) as claimed in claim 1, wherein the optically structured element (1) is attached or on an optical façade element.

* * * * *